United States Patent
Jayaram et al.

(10) Patent No.: US 10,373,207 B2
(45) Date of Patent: Aug. 6, 2019

(54) MANAGING ADVERTISING ASSOCIATED WITH DYNAMICALLY-EXPANDING CONTENT

(71) Applicant: Microsoft Technology Licensing, LLC, Redmond, WA (US)

(72) Inventors: Vinodh Jayaram, Fremont, CA (US); Bradley Scott Mauney, Mountain View, CA (US); Tan Nhu, Mountain View, CA (US); Andy Chen, Mountain View, CA (US); Gyanda Sachdeva, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 13/708,819

(22) Filed: Dec. 7, 2012

(65) Prior Publication Data
US 2014/0164138 A1     Jun. 12, 2014

(51) Int. Cl.
*G06Q 30/02*     (2012.01)

(52) U.S. Cl.
CPC ..... *G06Q 30/0269* (2013.01); *G06Q 30/0277* (2013.01)

(58) Field of Classification Search
CPC .... G06Q 30/02; G06Q 30/0255; G06Q 30/00; G06Q 30/0277; G06Q 30/0267; H04N 5/44582; H04N 7/012; H04N 21/482; H04N 2005/4432; H04N 21/42204; H04N 5/45; H04N 5/4403; H04N 2005/4419; G06F 3/0383; G06F 3/04842; G06F 3/0482; G06F 3/04855; G06F 3/04847; G06F 3/0346; G06F 3/0485; G06F 3/04886; G06F 3/0483; G06F 3/0488; G08C 2201/32
USPC ................. 705/14.53, 14.64, 14.73; 345/157
See application file for complete search history.

(56) References Cited

U.S. PATENT DOCUMENTS

| | | | | |
|---|---|---|---|---|
| 2006/0250358 | A1* | 11/2006 | Wroblewski | G06F 3/0346 345/157 |
| 2011/0112915 | A1* | 5/2011 | Geer, III | G06Q 30/00 705/14.73 |
| 2011/0282739 | A1* | 11/2011 | Mashinsky | G06Q 30/02 705/14.53 |

(Continued)

OTHER PUBLICATIONS

Meghwal, Praveen, "Load Data From Server While Scrolling Using jQuery AJAX", Apr. 26, 2012, Code Project, https://www.codeproject.com/Articles/239436/Load-Data-From-Server-While-Scrolling-Using-JQuery pp. 1/11-4/11 (Year: 2012).*

(Continued)

*Primary Examiner* — Patricia H Munson
(74) *Attorney, Agent, or Firm* — Schweman Lundberg & Woessner, P.A.

(57) ABSTRACT

A method of managing advertising associated with dynamically expanding content is disclosed. A request for a dynamic expansion of content is detected. The dynamic expansion includes adding additional content to content presented in a user interface. It is determined that a set of advertisements associated with the user interface is to be updated based on an updating criterion. The updating includes replacing an advertisement of the set of advertisements with an additional advertisement. The updating of the set of advertisements is performed.

18 Claims, 12 Drawing Sheets

(56) References Cited

U.S. PATENT DOCUMENTS

| | | | |
|---|---|---|---|
| 2012/0158875 A1* | 6/2012 | Almeida | G06Q 30/02 709/206 |
| 2014/0040029 A1* | 2/2014 | Vhora | H04L 67/22 705/14.54 |
| 2014/0095315 A1* | 4/2014 | Narendra | G06F 3/0488 705/14.64 |
| 2014/0137030 A1* | 5/2014 | Matas | G06F 3/00 715/784 |

OTHER PUBLICATIONS

"Create a Dynamic Scrolling Content Box Using AJAX", Aug. 4, 2009, Web Developer Plus, http://webdeveloperplus.com/jquery/create-a-dynamic-scrolling-content-box-using-ajax/ pp. 1/13-4/13 (Year: 2009).*

* cited by examiner

MANAGING ADVERTISING ASSOCIATED WITH DYNAMICALLY-EXPANDING CONTENT

TECHNICAL FIELD

This application relates generally to the technical field of internet marketing and, in one specific example, to managing advertising presented with respect to a set of content items that is configured to dynamically expand as the user browses the content items in a user interface.

BACKGROUND

Traditionally, online content or an information resource (e.g., an internet web page) was associated with a predefined list of content items, such as a list of news items, jobs, search results, etc. If, after viewing all of the content items associated with an information resource, a user wanted to view additional related content items, the user would typically navigate (e.g., click a link) to an additional information resource that included an additional list of the additional related content items. Thus, content items corresponding to a particular subject (e.g., Google search results) were separated into lists that were distributed across multiple information resources. In such an environment, advertisement placement was often simply a matter of associating different advertisements with each information resource. For example, a first set of advertisements were associated with a first web page (e.g., based on a relationship between the first set of advertisements and the content items associated with the first web page), a second set of advertisements were associated with the second set of web pages, and so on. Then, when a user navigated from a first web page to a second web page, different advertisements were presented to the user.

However, some information resources are configured to grow dynamically and continually. These information resources may appear to be bottomless or infinite to a user. For example, a user may access a web page that includes what appears at first to be a static list of content items. However, when the user scrolls down to the bottom of the web page, additional content items may be appended to the list of content items associated with the web page. When the user scrolls down to the bottom of the web page again, even more content items may be appended to the list. And so on. The list of content items associated with such an information resource may grow almost indefinitely. In this case, the user need not navigate from a first information resource to a second information resource to view an additional list of content items. For such dynamically growing information resources, management of advertising presented in conjunction with the information resources may become a complex problem.

BRIEF DESCRIPTION OF THE DRAWINGS

Some embodiments are illustrated by way of example and not limitation in the figures of the accompanying drawings in which:

FIG. 9 is a screenshot of an example embodiment of a user interface in which advertising is associated with content that may be dynamically expanded;

FIG. 10 is a screen shot of an example embodiment of a user interface in which the user has requested a dynamic expansion of the content presented in a user interface by scrolling to the bottom of a list of content items;

FIG. 11 is a screen shot of an example embodiment of a user interface in which additional content items have been added to a list of content items based on input from the user and advertising associated with the list of content items has been updated.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

In various embodiments, a method of managing advertising associated with dynamically expanding content is disclosed. A request for a dynamic expansion of content presented in a user interface is detected. The dynamic expansion includes adding additional content to the content presented in the user interface. It is determined that a set of advertisements associated with content and the additional content is to be updated based on an updating criterion, such as a length of time the user views the content in the user interface, the speed at which the user navigates through the content in the user interface, or the distance over which the user navigates the content in the user interface (e.g., by jumping over portions of the content). The updating includes replacing an advertisement of the set of advertisements with an additional advertisement. The updating of the set of advertisements is performed.

This method and other methods or embodiments disclosed herein may be implemented as a computer system having one or more modules (e.g., hardware modules or software modules). This method and other methods or embodiments disclosed herein may be embodied as instructions stored on a machine-readable medium that, when executed by a processor, cause the processor to perform the method.

Figure 1:
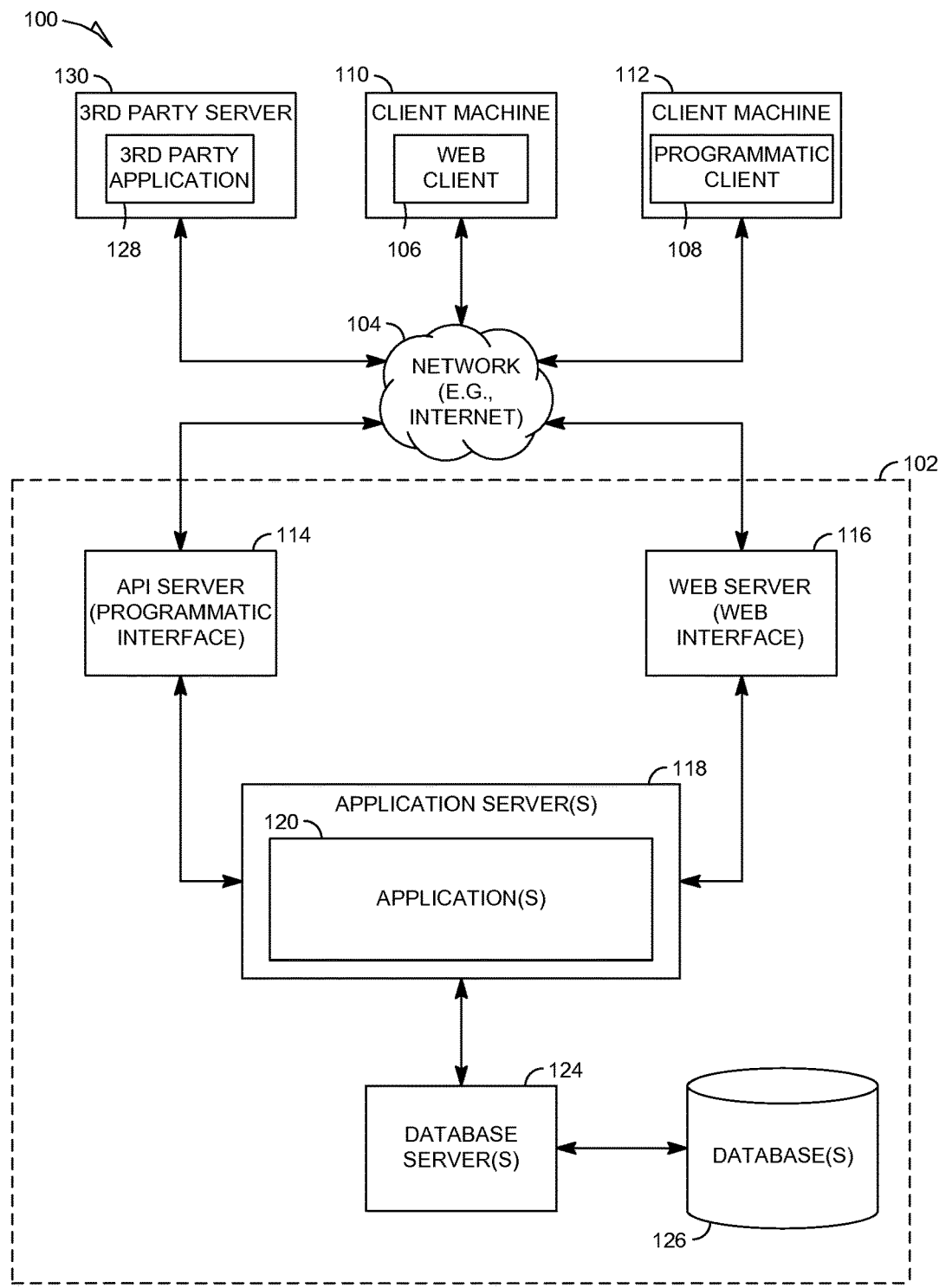
FIG. 1 is a network diagram depicting a client-server system, within which various example embodiments may be deployed.

FIG. 1 is a network diagram depicting a client-server system 100, within which various example embodiments may be deployed. A networked system 102, in the example forms of a network-based networking site or other communication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases or NoSQL or non-relational data stores 126.

The applications 120 may provide a number of functions and services to users that access the networked system 102. While the applications 120 are shown in FIG. 1 to form part of the networked system 102, in alternative embodiments, the applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various applications 120 could also be implemented as standalone software programs, which do not necessarily have computer networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the applications 128, 106, and 108 may be coupled to multiple applications 120, such as payment applications associated with multiple payment processors (e.g., Visa, MasterCard, and American Express).

The web client 106 accesses the various applications 120 via the web interface supported by the web server 116. Similarly, the programmatic client 108 accesses the various services and functions provided by the applications 120 via the programmatic interface provided by the API server 114. The programmatic client 108 may, for example, perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional or payment functions that are supported by the relevant applications of the networked system 102.

Figure 2:
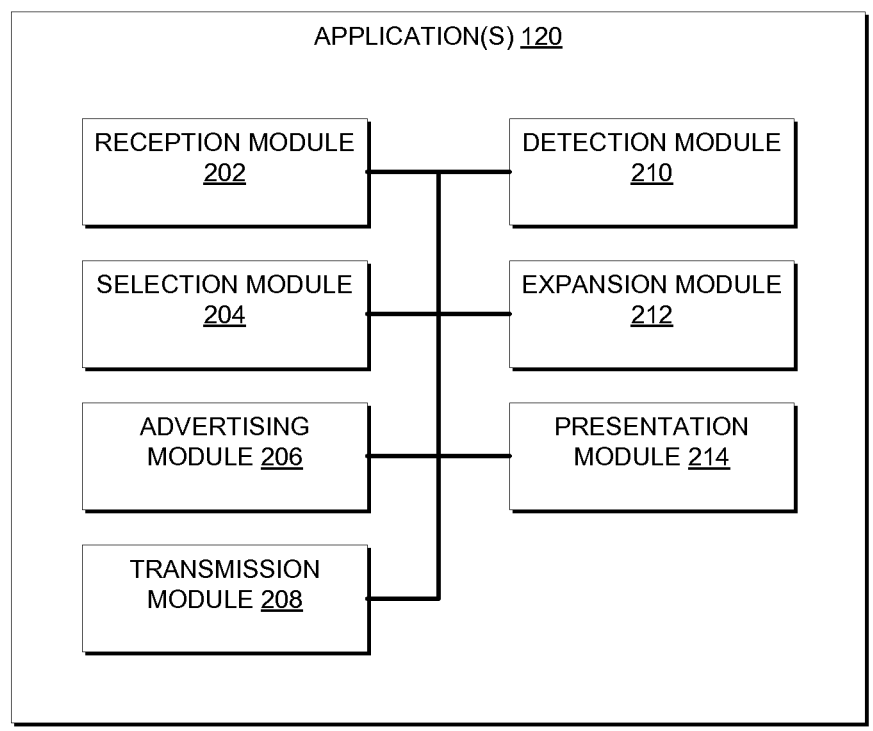
FIG. 2 is a block diagram illustrating example modules that may implement various example embodiments.

FIG. 2 is a block diagram illustrating example modules of the application(s) 120 of FIG. 1. The reception module 202 is configured to receive communications, such as requests or responses. The selection module 204 is configured to select additional content for including on a dynamically-expanding content page. The advertising module 206 is configured to select advertising to associate with a dynamically-expanding content page. In various embodiments, advertising is to be construed broadly as any communication made for marketing purposes. Thus, the advertising associated with a list of content items may include traditional online advertisements (e.g., advertising purchased by a party external to the system 102) or communications by the system 102 promoting features of the system 102, such as a communication of jobs listed with respect to the system 102 that the user may be interested in or a communication of an application that the user may wish to download from the iTunes store to take advantage of features of the system 102. The transmission module 208 is configured to send communications, such as requests or responses. The detection module 210 is configured to detect whether a dynamic expansion of content has been triggered (e.g., based on input from a user). The expansion module 212 is configured to dynamically expand content presented on a content page. The presentation module 214 is configured to present content and advertising to a user (e.g., on a content page).

Although the modules 202-220 are depicted in FIG. 2 as being included in the application(s) 120, in various embodiments one or more of the modules may be included in a client, such as the 3rd party application 128, web client 106, or programmatic client 108 of FIG. 1. In other words, the modules may be distributed among the servers and clients such that some or all of the functionality is provided on the server side or some or all of the functionality is provided on the client side. For example, the transmission module may be distributed such that a portion of the transmission module is implemented on the client side (e.g., for sending requests to the server) and a portion of the transmission module is implemented on the server side (e.g., for sending responses to the client).

Figure 3:
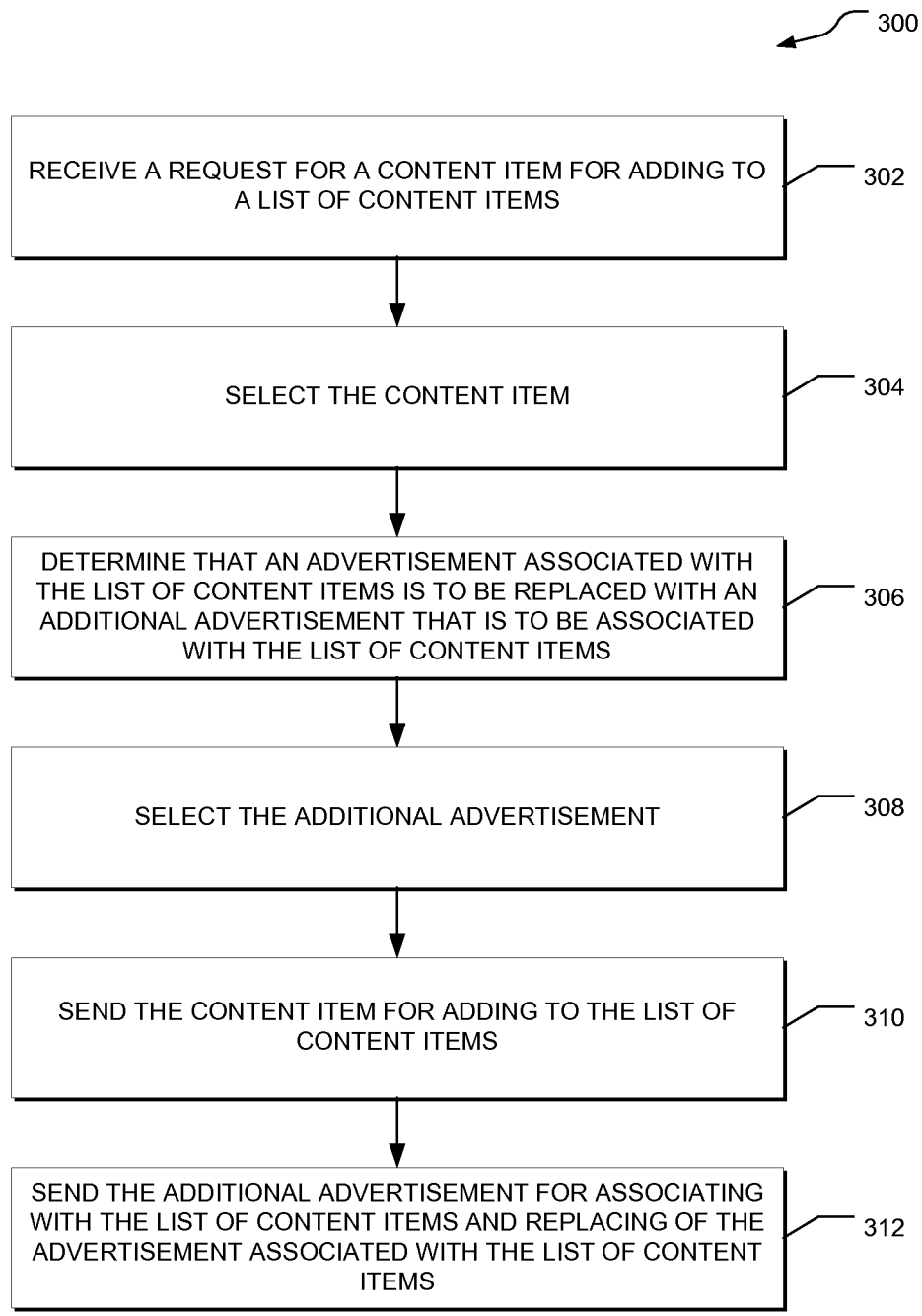
FIG. 3 is a flow chart illustrating example operations of a method of providing content items for including in a list of content items and an advertisement for associating with the content items.

FIG. 3 is a flow chart illustrating example operations of a method 300 of providing content items for including in a list of content items and an advertisement for associating with the content items. In various embodiments, the method 300 is implemented by the modules 202-220 of FIG. 2. At operation 302, the reception module receives a request for one or more additional content items for adding to a list of content items. The request may be sent from a client (e.g., a web browser executing on a client device) based on a detection (e.g., via JavaScript) of a user performing an action with respect to a dynamic web page, such as scrolling to the bottom of a list of content items included on the web page. In various embodiments, the request may request a particular number of additional content items. Or the request may request additional content items without specifying a particular number of the additional content items.

At operation 304, the selection module selects the one or more content items for adding to the list of content items. For example, if the list of content items includes a list of people the user may know (e.g., see FIG. 9-11), the content item may be one or more additional people that the user may know. The selection module may select the additional content items from a database based on various criteria. For example, in selecting additional people that a user may know, the selection module may consider a level of relatedness of the additional people to the user or similarities between the additional people and the user (e.g., skills, interests, education, title, and so on).

At operation 306, the advertising module may determine that one or more advertisements associated with the list of content items is to be replaced with one or more additional advertisements that are to be associated with the list of content items. For example, the advertising module may determine that an advertisement has been displayed to the user for a particular amount of time and is thus due to be replaced by an additional advertisement. Or the advertising module may determine that the user has made a particular number of requests for additional content items without an additional advertisement having been provided for displaying with respect to the list of content items. For example, the advertising module may determine that a new advertisement is to be provided for displaying with respect to the list of content items after every other request for additional content items.

The advertising module may determine that a new advertisement is to be provided for displaying with respect to the list of content items based on a distance over which the user navigates the plurality of content items (e.g., by a size of a jump that the user makes from one content item to another content item while browsing the content items). Or the advertising module may determine that a new advertisement is to be provided based on a speed at which the user navigates the list of content items (e.g., a scrolling speed of the user).

At operation 308, the advertising module may select the one or more advertisements from a set of advertisements based on various criteria. For example, the advertising module may select an advertisement based on a similarity between a subject matter of the advertisement and a subject matter of the additional content items that were selected. Or the advertising module may select the advertisement based on a bid by an advertiser for advertising space on the content page on which the list of content items is being displayed to the user. Or the advertising module may select the advertisement based on a relevance of a subject of the advertisement to the user (e.g., based on information included in a profile of the user, information about the social connectedness of the user, information about an observed behavior of the user, and so on). Or the advertising module may select the advertisement based on a context of the user (e.g., what the user is doing with respect to the system 102).

For example, the advertising module 308 may determine that the list of content items pertains to a white paper about manufacturing operations, the user is an operations manager at General Electric, and the user is viewing the white paper while viewing a list of people that the user may know. Based on these determinations, the advertising module may select an advertisement that is most relevant to the user. Additionally, based on these determinations, the advertising module may determine an optimal refresh rate for advertising that is to be presented to the user while he is viewing dynamically expanding content of the white paper.

At operation 310, the transmission module sends the one or more additional content items for adding to the list of content items. In other words, the transmission module sends a response to the received request, the response including the one or more selected additional content items. In response, the client (e.g., a script executing with respect to a web page being displayed to the user in a web browser of a client device) may update the list of content items to include the one or more selected additional content items. In various embodiments, the transmission module may send any amount of additional content items. In other words, the transmission module may send a number of content items that is less than, equal to, or more than the number of additional content items that were requested. It may be left to the client to determine how to filter or present the one or more additional content items to the user based on the number of additional content items that are sent.

At operation 312, the transmission module sends the one or more additional advertisements for associating with the list of content items. In various embodiments, the client may, in response to receiving the one or more additional advertisements, update one or more advertisements that are presented to the user with respect to the list of content items.

Figure 4:
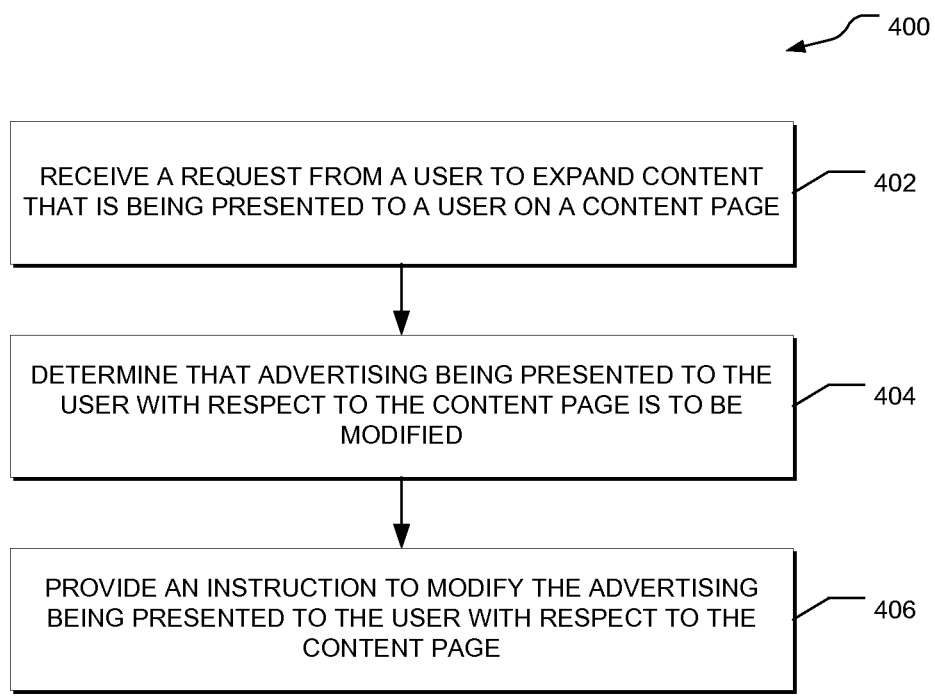
FIG. 4 is a flow chart illustrating example operations of a method of updating advertising associated with a content page based on a request from a user to expand the content that is presented on the content page.

FIG. 4 is a flow chart illustrating example operations of a method 400 of updating advertising associated with a content page based on a request from a user to expand the content that is presented on the content page. In various embodiments, the method 400 is implemented by the modules 202-220 of FIG. 2. At operation 402, the reception module receives a request from a user to expand content that is being presented to a user on a content page. For example, the reception module receives a request to provide more text of a portion of a news article that is being displayed on a web page.

At operation 404, the advertising module determines that advertising being presented to the user with respect to the content page is to be modified. For example, the advertising module determines that one or more advertisements that have been provided to a client (e.g., a web browser executing on a client device) are in need of updating based on one or more criteria, such as an amount of time that the advertisements have been visible to the user, whether the advertising was refreshed the last time the user requested that the content be expanded, and so on.

At operation 406, based on the determination that the advertising is to be modified, the transmission module provides an instruction to the client to modify the advertising. For example, the transmission module may provide instructions the client to replace one or more advertisements with one or more additional advertisements for displaying on the content page.

Figure 5:
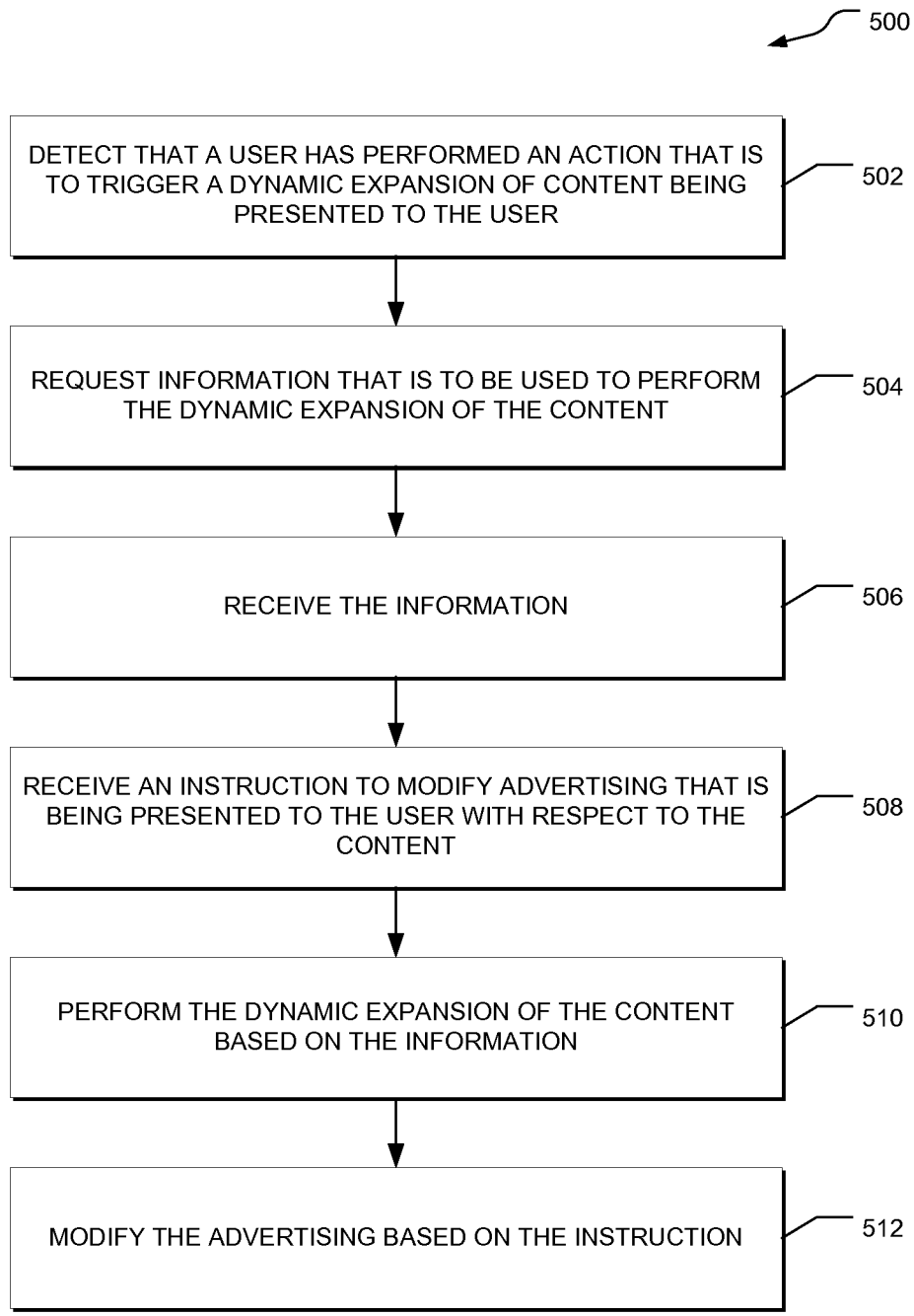
FIG. 5 is a flow chart illustrating example operations of a method of updating advertising associated with a content page based on a request from a user to expand the content that is presented on the content page.

FIG. 5 is a flow chart illustrating example operations of a method 500 of updating advertising associated with a content page based on a request from a user to expand the content that is presented on the content page. In various embodiments, the method 500 is implemented by the modules 202-220 of FIG. 2. At operation 502, the detection module detects that a user has performed an action that is to trigger a dynamic expansion of content being presented to the user. For example, the detection module detects that the user has scrolled down to the bottom of a web page containing a list of content items.

At operation 504, the transmission module sends a request for information that is to be used to perform the dynamic expansion of the content. For example, the transmission module sends a request to the application(s) 120 to send additional content corresponding to the content, such as additional text of a news article, additional people that the user may know, and so on. In various embodiments, the transmission module specifies parameters of the request, such as an amount of additional content (e.g., a number of additional words or characters of an article, a number of additional people that the user may know, and so on). In alternative embodiments, the transmission module does not specify any parameters with the request.

At operation 506, the reception receives the requested information. For example, the reception module receives additional text of a news article that is being displayed to the user.

At operation 508, the reception module receives an instruction to modify advertising that is being presented to the user with respect to the content. For example, the reception module receives an instruction to replace one or more advertisements that are being presented to the user with respect to the content with one or more additional advertisements. In various embodiments, the reception module may also receive the additional advertisements.

At operation 510, the expansion module performs the dynamic expansion of the content based on the information. For example, the expansion module expands a news article to include the additional text of the news article. Or the expansion module expands a list of people that the user may know to include additional people that the user may know. In various embodiments, the expansion module automatically expands the content to include all of the information received from the application(s) 120. In alternative embodiments, the expansion module filters the information based on various criteria, such as the characteristics of the device on which the information is to be displayed (e.g., the screen size, etc.) or preferences of the user. Thus, in various embodiments, the expansion module may determine how much of the information received from the application(s) 120 to present to the user.

At operation 512, the advertising module modifies the advertising based on the instruction. For example, the advertising may replace one or more advertisements with one or more additional advertisements for displaying to the user with respect to the dynamically expanded content.

Figure 6:
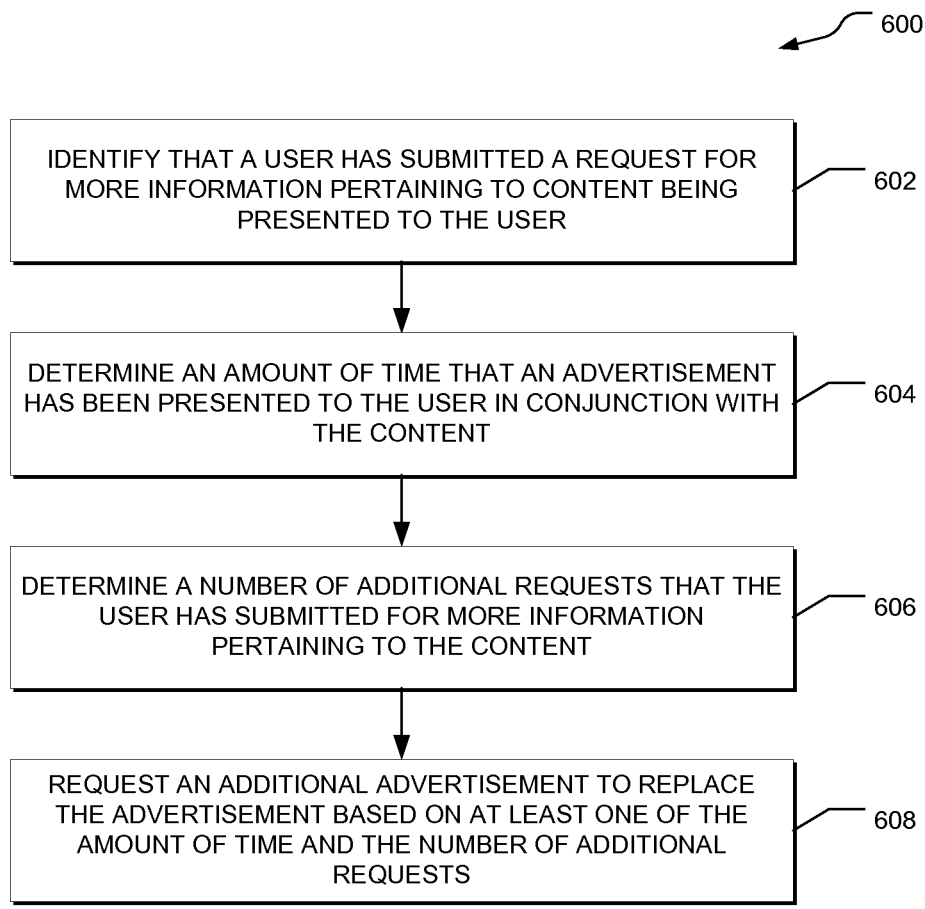
FIG. 6 is a flow chart illustrating example operations of a method of updating advertising associated with a content that is being presented to a user.

FIG. 6 is a flow chart illustrating example operations of a method 600 of updating advertising associated with a content that is being presented to a user. In various embodiments, the method 600 is implemented by the modules 202-220 of FIG. 2. At operation 602, the detection module identifies that a user has submitted a request for more information pertaining to content that is being presented to the user.

At operation 604, the advertisement module determines an amount of time that one or more advertisements have been displayed to the user in conjunction with the content. At operation 606, the advertising module determines a number of additional requests that the user has submitted for more information pertaining to the content. At operation 608, the transmission module requests one or more additional advertisements to replace the one or more advertisements based on at least one of the amount of time and the number of additional requests.

Figure 7:
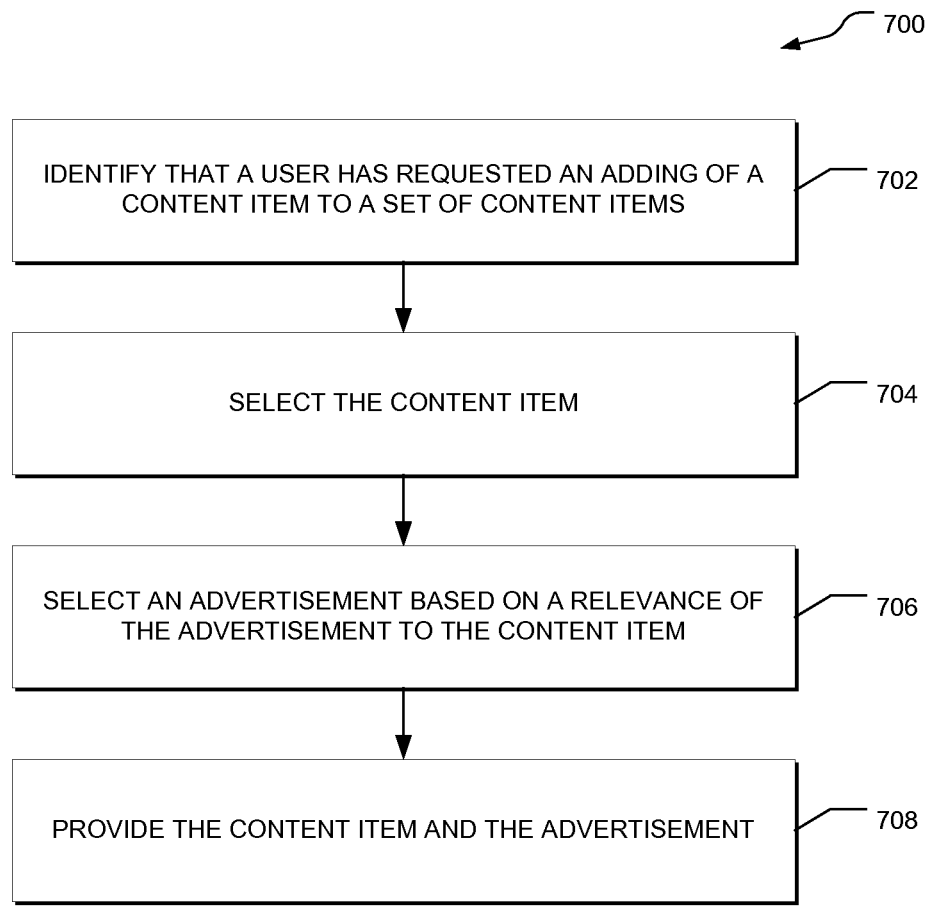
FIG. 7 is a flow chart illustrating example operations of a method of updating content and advertising associated with the content.

FIG. 7 is a flow chart illustrating example operations of a method 700 of updating content and advertising associated with the content. In various embodiments, the method 700 is implemented by the modules 202-220 of FIG. 2. At operation 702, the detection module identifies that a user has requested an adding of one or more content items to a set of content items (e.g., content items being presented to the user on a web page).

At operation 704, the selection module selects the one or more content items based on one or more criteria, as described above. At operation 706, the advertising module selects an advertisement based on a relevance of the advertisement to the content item.

At operation 708, the transmission module provides the content item and the advertisement (e.g., to a client for updating the content and the advertising associated with a web page being presented to the user).

Figure 8:
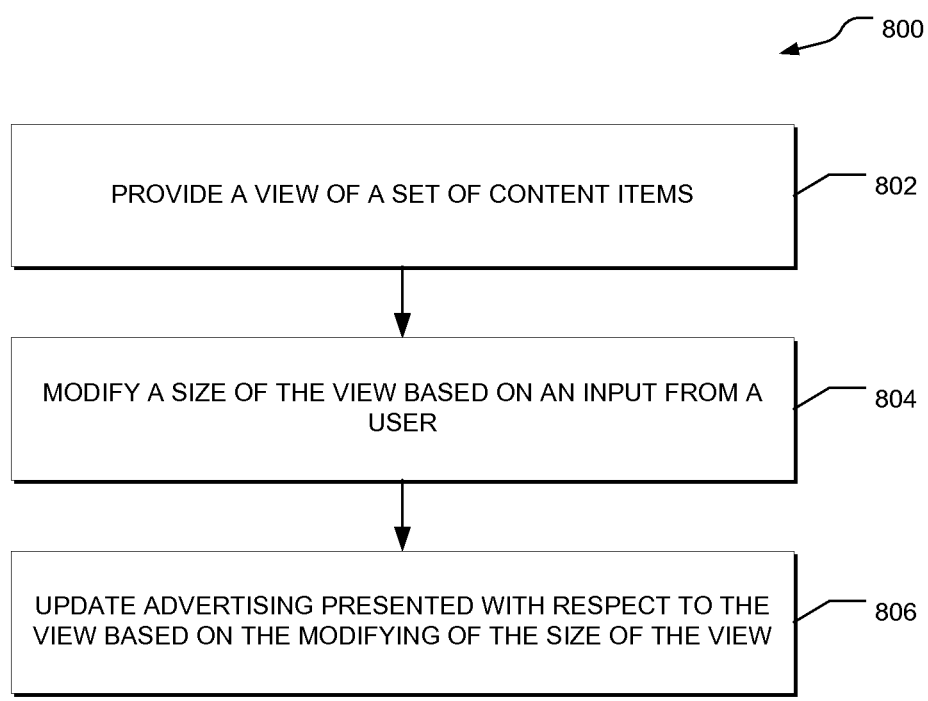
FIG. 8 is a flow chart illustrating example operations of a method of updating content and advertising associated with the content.

FIG. 8 is a flow chart illustrating example operations of a method 800 of updating content and advertising associated with the content. In various embodiments, the method 800 is implemented by the modules 202-220 of FIG. 2. At operation 802, the presentation module provides a view of a set of content items. For example, the presentation module presents a subset of the set of the content items to a user.

At operation 804, the presentation module modifies a size of the view based on an input from the user. For example, the presentation module determines to increase or decrease the size of the view, thus increasing or decreasing the subset of the set of content items that are displayed in the view, based on the user scrolling to the top or bottom of the view.

At operation 806, the presentation module updates advertising being presented with respect to the view based on the modifying of the size of the view. For example, the presentation module may determine to present one or more additional advertisements based on the one or more additional advertisements being more relevant to the subset of the content items that is visible in the modified view than the subset of the content items that was visible in the unmodified view. Or the presentation module may determine to replace one or more advertisements with one or more additional advertisements based on an amount of time that the one or more advertisements were visible to the user between modifications of the size of the view.

Figure 9:
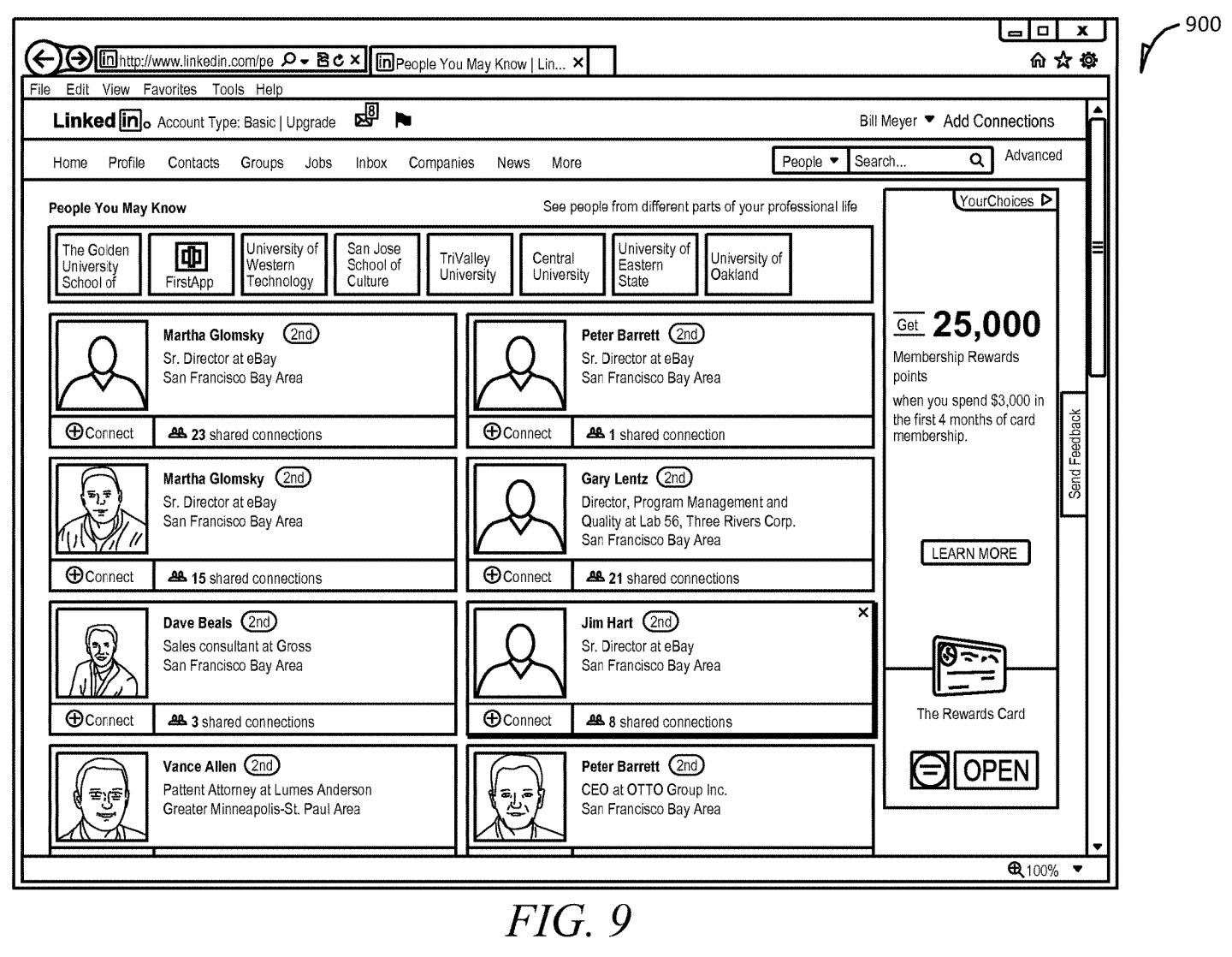

FIG. 9 is a screenshot of an example embodiment of a user interface 900 in which advertising is associated with content that may be dynamically expanded. In various embodiments, the user interface may be presented by the presentation module of FIG. 2. The dynamically-expandable content includes a list of people that the user may know. The advertising includes an advertisement in the right margin of the content page.

Figure 10:
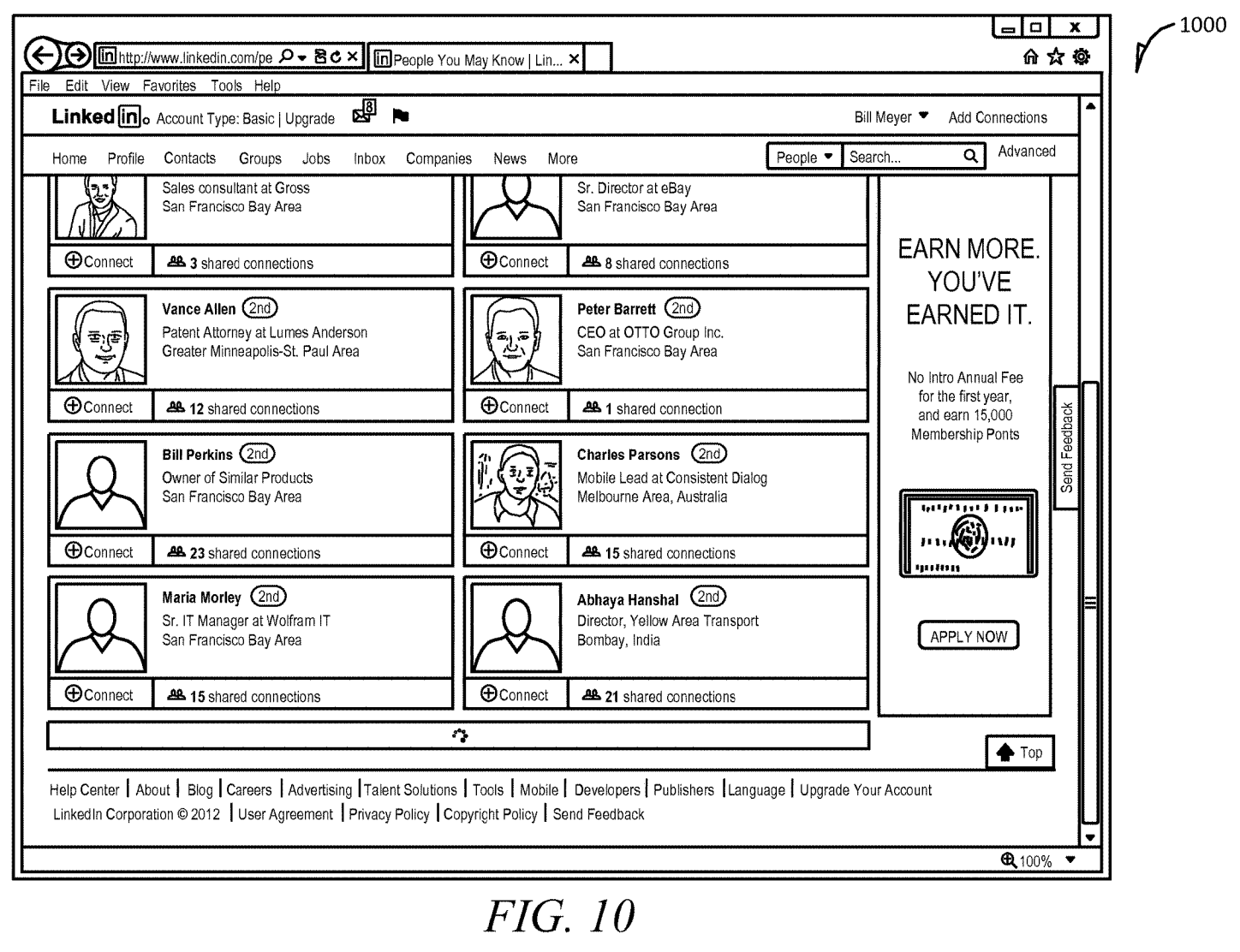

FIG. 10 is a screen shot of an example embodiment of a user interface 1000 in which the user has requested a dynamic expansion of the content of a content page by scrolling to the bottom of a list of content items. In various embodiments, the user interface may be presented by the presentation module of FIG. 2. An icon at the bottom of the list of content items signals to the user that the user has triggered a dynamic expansion of the web page and that new content items are about to be added to the list of content items. In various embodiments, the advertising is updated while the new content items are fetched from the server.

Figure 11:
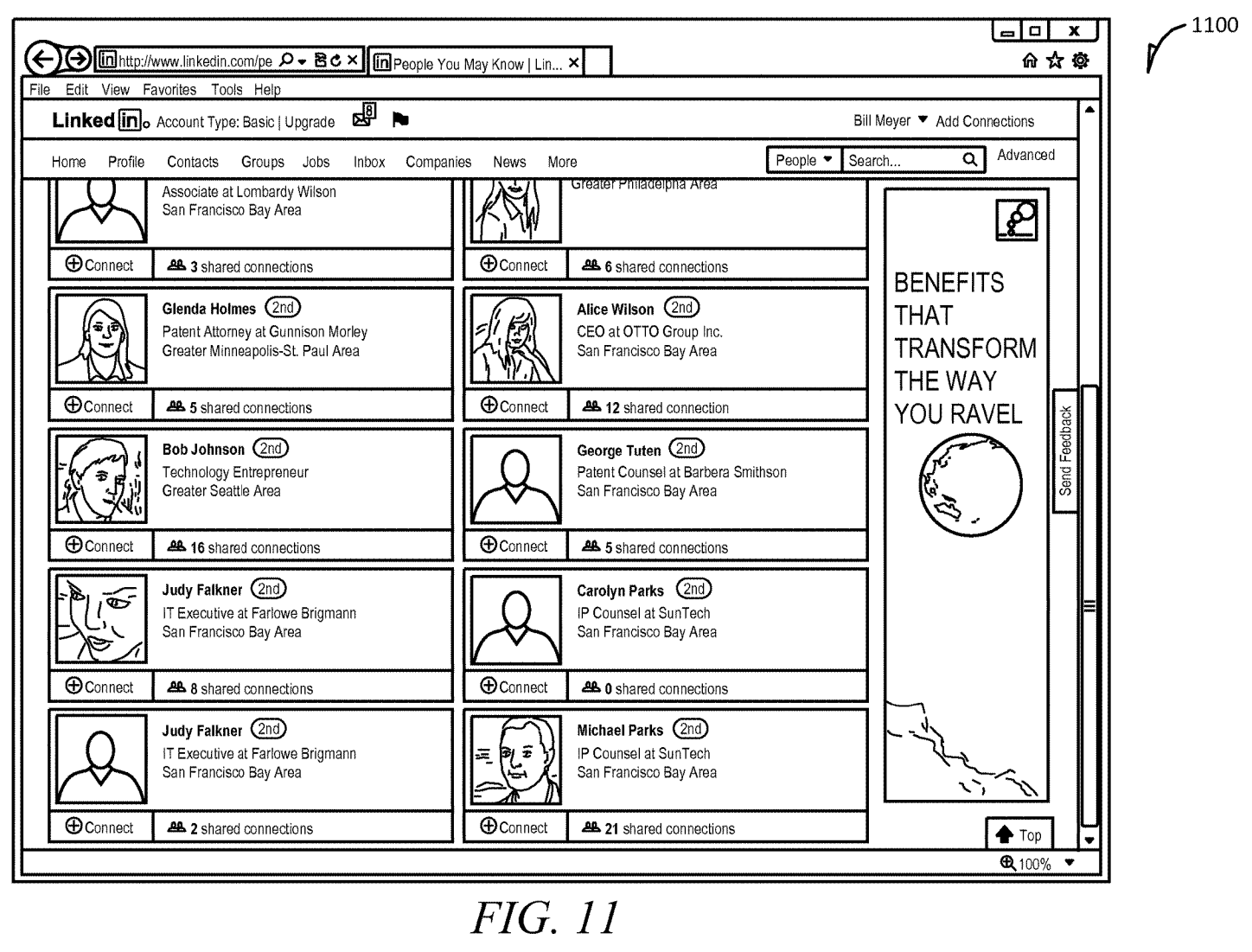

FIG. 11 is a screen shot of an example embodiment of a user interface 1100 in which additional content items have been added to a list of content items based on input from the user and advertising associated with the list of content items has been updated. In various embodiments, the user interface may be presented by the presentation module of FIG. 2. In various embodiments, the advertising remains visible to the user regardless of how far up or how far down the user scrolls in the content list. In other words, the advertising remains in a fixed position on the content page regardless of the scrolling of the view of the content items displayed on the content page. In various embodiments, the advertising may be included within or interspersed with the content items displayed in the content page and may be scrollable within the view of the list of content items.

For example, the advertising may be presented as a logical horizontal page break between content items in a first group of content items (e.g., a first logical page) and content items in a second group of content items (e.g., a second logical page) that is fetched from the server. In various embodiments, the page break may be presented upon a triggering of a dynamic expansion, thus visually separating the content items presented in the user interface before the dynamic expansion from the content items presented in the user interface after the dynamic expansion. In various embodiments, the horizontal page break may be presented instead of or in addition to the icon described above. In various embodiments, the advertising may be included in the horizontal page break and presented to the user while additional content items are being fetched from the server.

Figure 12:
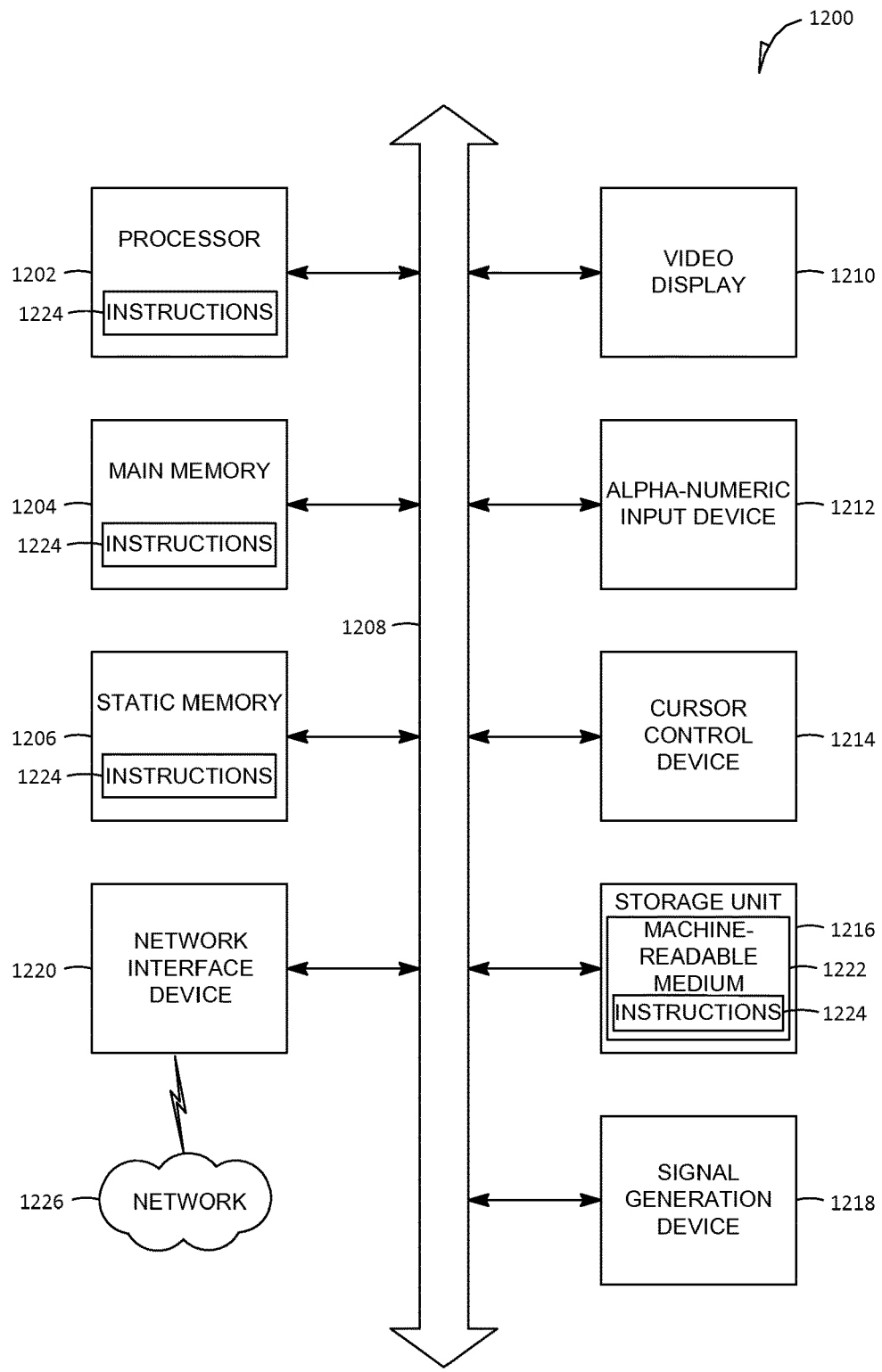
FIG. 12 is a block diagram of a machine in the example form of a computer system within which instructions for causing the machine to perform any one or more of the methodologies discussed herein may be executed.

FIG. 12 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
communicating, using one or more processors of a social networking system, a list of a plurality of content items for presentation in a first region of a user interface of a device of a user;
communicating a set of advertisements for presentation in a second region of the user interface, the set of advertisements remaining in a fixed position in the second region regardless of a scrolling of the list of the plurality of content items in the first region;
detecting a triggering by a user of a dynamic expansion of the list of the plurality of content items included in the first region, the triggering including scrolling to an end of the list of the plurality of content items included in the first region, the dynamic expansion including an adding of a content item to the list of the plurality of content items included in the first;
detecting at least one of a speed at which the user navigates through the list of the plurality of content items in a view port of the user interface, a distance over which the user navigates through the list of the plurality of content items in the view port of the user interface, and a time period over which the user navigates through the list of the plurality of content items in the view port of the user interface; and
replacing an advertisement of the set of advertisements with a replacement advertisement based on the triggering by the user of the dynamic expansion and an updating criterion pertaining to the at least one of a speed at which the user navigates through the list of the plurality of content items in a view port of the user interface, a distance over which the user navigates through the list of the plurality of content items in the view port of the user interface, and a time period over which the user navigates through the list of the plurality of content items in the view port of the user interface.

2. The method of claim 1, wherein the updating criterion further pertains to a number of previous dynamic expansions of the list of the plurality of content items that occurred before the dynamic expansion of the list of the plurality of content items without an additional updating of the set of advertisements.

3. The method of claim 1, wherein the updating criterion further pertains to a length of time between the dynamic expansion and a previous dynamic expansion.

4. The method of claim 1, wherein the updating criterion further pertains to a relevancy between the content item and the replacement advertisement in comparison to a relevancy between the content item and the advertisement.

5. The method of claim 4, wherein the relevancy is based on a combination of associations between a subject of the advertisement, a subject of the content item, and information about the user.

6. The method of claim 5, wherein the information about the user includes a combination of information specified in a profile of the user, information collected from observations of behaviors of the user, and information pertaining to a social connectedness of the user with respect to the social networking system.

7. A system comprising:
one or more computer processors;
a non-transitory computer readable medium comprising a set of instructions that, when executed by the one or more computer processors,
cause the one or more processors to perform operations comprising:
communicating a list of a plurality of content items for presentation in a first region of a user interface of a device of a user;
communicating a set of advertisements for presentation in a second region of the user interface, the set of advertisements remaining in a fixed position in the second region regardless of a scrolling of the list of the plurality of content items in the first region;
detecting a triggering by a user of a dynamic expansion of the list of the plurality of content items included in the first region, the triggering including scrolling to an end of the list of the plurality of content items included in the first region, the dynamic expansion including an adding of a content item to the list of the plurality of content items included in the first;
detecting at least one of a speed at which the user navigates through the list of the plurality of content items in a view port of the user interface, a distance over which the user navigates through the list of the plurality of content items in the view port of the user interface, and a time period over which the user navigates through the list of the plurality of content items in the view port of the user interface; and
replacing an advertisement of the set of advertisements with a replacement advertisement based on the triggering by the user of the dynamic expansion and an updating criterion pertaining to the at least one of a speed at which the user navigates through the list of the plurality of content items in a view port of the user interface, a distance over which the user navigates through the list of the plurality of content items in the view port of the user interface, and a time period over which the user navigates through the list of the plurality of content items in the view port of the user interface.

8. The system of claim 7, wherein the updating criterion further pertains to a number of previous dynamic expansions of the list of the plurality of content items that occurred before the dynamic expansion of the list of the plurality of content items without an additional updating of the set of advertisements.

9. The system of claim 7, wherein the updating criterion further pertains to a length of time between the dynamic expansion and a previous dynamic expansion.

10. The system of claim 7, wherein the updating criterion further pertains to a relevancy between the content item and the replacement advertisement in comparison to a relevancy between the content item and the advertisement.

11. The system of claim 10, wherein the relevancy is based on a combination of associations between a subject of the advertisement, a subject of the content item, and information about the user.

12. The method of claim 11, wherein the information about the user includes a combination of information specified in a profile of the user, information collected from observations of behaviors of the user, and information pertaining to a social connectedness of the user with respect to the social networking system.

13. A non-transitory machine readable medium embodying a set of instructions that, when added to a social network system, cause one or more processors of the social network system to perform operations comprising:
communicating a list of a plurality of content items for presentation in a first region of a user interface of a device of a user;
communicating a set of advertisements for presentation in a second region of the user interface, the set of advertisements remaining in a fixed position in the second region regardless of a scrolling of the list of the plurality of content items in the first region;

detecting a triggering by a user of a dynamic expansion of the list of the plurality of content items included in the first region, the triggering including scrolling to an end of the list of the plurality of content items included in the first region, the dynamic expansion including an adding of a content item to the list of the plurality of content items included in the first;

detecting at least one of a speed at which the user navigates through the list of the plurality of content items in a view port of the user interface, a distance over which the user navigates through the list of the plurality of content items in the view port of the user interface, and a time period over which the user navigates through the list of the plurality of content items in the view port of the user interface; and replacing an advertisement of the set of advertisements with a replacement advertisement based on the triggering by the user of the dynamic expansion and an updating criterion pertaining to the at least one of a speed at which the user navigates through the list of the plurality of content items in a view port of the user interface, a distance over which the user navigates through the list of the plurality of content items in the view port of the user interface, and a time period over which the user navigates through the list of the plurality of content items in the view port of the user interface.

14. The non-transitory machine readable medium of claim 13, wherein the updating criterion further pertains to a number of previous dynamic expansions of the list of the plurality of content items that occurred before the dynamic expansion of the list of the plurality of content items without an additional updating of the set of advertisements.

15. The non-transitory machine readable medium of claim 13, wherein the updating criterion further pertains to a length of time between the dynamic expansion and a previous dynamic expansion.

16. The non-transitory machine readable medium of claim 13, wherein the updating criterion further pertains to a relevancy between the content item and the replacement advertisement in comparison to a relevancy between the content item and the advertisement.

17. The non-transitory machine readable medium of claim 16, wherein the relevancy is based on an association between a subject of the advertisement, a subject of the content item, and information about the user.

18. The non-transitory machine readable medium of claim 17, wherein the information about the user includes a combination of information specified in a profile of the user, information collected from observations of behaviors of the user, and information pertaining to a social connectedness of the user with respect to the social networking system.

* * * * *